United States Patent
Jufuku et al.

(10) Patent No.: US 9,537,159 B2
(45) Date of Patent: Jan. 3, 2017

(54) FUEL CELL VEHICLE

(75) Inventors: Yasunobu Jufuku, Mishima (JP); Hiroshi Arisawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 970 days.

(21) Appl. No.: 12/451,095

(22) PCT Filed: May 9, 2008

(86) PCT No.: PCT/JP2008/058997
§ 371 (c)(1),
(2), (4) Date: Oct. 26, 2009

(87) PCT Pub. No.: WO2008/143154
PCT Pub. Date: Nov. 27, 2008

(65) Prior Publication Data
US 2010/0116576 A1 May 13, 2010

(30) Foreign Application Priority Data
May 11, 2007 (JP) .................................. 2007-127194

(51) Int. Cl.
*H01M 8/04029* (2016.01)
*H01M 8/04* (2016.01)
(Continued)

(52) U.S. Cl.
CPC ............ *H01M 8/04029* (2013.01); *B60K 1/04* (2013.01); *B60L 11/1896* (2013.01);
(Continued)

(58) Field of Classification Search
None
See application file for complete search history.

(56) References Cited

U.S. PATENT DOCUMENTS 6,040,073 A * 3/2000 Okamoto ...................... 429/437
6,158,537 A * 12/2000 Nonobe ......................... 429/431
(Continued)

FOREIGN PATENT DOCUMENTS

JP  A-2001-119815  4/2001
JP  A-2001-294048  10/2001
(Continued)

OTHER PUBLICATIONS

Supplementary European Search Report issued in Application No. EP 08 75 2850.1 dated Jul. 11, 2011.

*Primary Examiner* — Miriam Stagg
*Assistant Examiner* — Carmen Lyles-Irving
(74) *Attorney, Agent, or Firm* — Oliff PLC (57) ABSTRACT

In a fuel cell vehicle of the present invention, a floor panel is constructed to have a center tunnel formed to extend in a front-rear direction of the vehicle. A fluid distributor provided below the floor panel is at least partly located in the center tunnel and is operative to distribute a supply of a fluid in a vehicle width direction. At least one fuel cell stack is provided adjacent to the fluid distributor in the vehicle width direction below the floor panel and is operative to receive the distributive supply of the fluid from the fluid distributor. This fuel cell system has an efficient component layout from the total standpoint of the operability and the space efficiency.

6 Claims, 9 Drawing Sheets (51) Int. Cl.
  *B60K 1/04* (2006.01)
  *B60L 11/18* (2006.01)
  *H01M 8/24* (2016.01)
  *B60K 15/07* (2006.01)

(52) U.S. Cl.
  CPC ..... *B60L 11/1898* (2013.01); *H01M 8/04089* (2013.01); *H01M 8/04955* (2013.01); *H01M 8/2415* (2013.01); *H01M 8/2465* (2013.01); *B60K 15/07* (2013.01); *B60K 2001/0416* (2013.01); *B60K 2001/0422* (2013.01); *B60K 2001/0438* (2013.01); *H01M 2250/20* (2013.01); *Y02E 60/50* (2013.01); *Y02T 90/32* (2013.01); *Y02T 90/34* (2013.01)

(56) References Cited

U.S. PATENT DOCUMENTS

| | | | |
|---|---|---|---|
| 6,536,551 B1 | 3/2003 | Tanaka et al. | |
| 6,653,008 B1* | 11/2003 | Hirakata et al. | 429/434 |
| 2006/0024542 A1* | 2/2006 | Uozumi et al. | 429/22 |
| 2006/0228601 A1* | 10/2006 | Yoshida | 429/22 |
| 2007/0007060 A1 | 1/2007 | Ono et al. | |
| 2007/0065696 A1 | 3/2007 | Fukuma et al. | |
| 2007/0122669 A1* | 5/2007 | Kusano et al. | 429/26 |

FOREIGN PATENT DOCUMENTS

| | | |
|---|---|---|
| JP | A-2003-172790 | 6/2003 |
| JP | A-2004-6383 | 1/2004 |
| JP | A-2004-127747 | 4/2004 |
| JP | A-2004-161055 | 6/2004 |
| JP | A-2005-231549 | 9/2005 |
| JP | A-2005-306104 | 11/2005 |
| JP | A-2006-36117 | 2/2006 |
| JP | A-2007-15615 | 1/2007 |
| JP | A-2007-15616 | 1/2007 |
| JP | A-2007-039004 | 2/2007 |
| JP | A-2007-87760 | 4/2007 |
| WO | WO 02/053402 A1 | 7/2002 |
| WO | WO 2005/034272 A1 | 4/2005 |
| WO | WO 2006/022050 A1 | 3/2006 |

* cited by examiner

Fig.1 FIRST EMBODIMENT

Fig.3

B-B FRAGMENTARY VIEW

Fig.4

D-D FRAGMENTARY VIEW

Fig.5

C-C FRAGMENTARY VIEW

Fig.6

E-E FRAGMENTARY VIEW

Fig.7

FIRST MODIFICATION OF FIRST EMBODIMENT

Fig.8

F-F FRAGMENTARY VIEW

Fig.9

SECOND MODIFICATION OF FIRST EMBODIMENT

Fig.10

THIRD MODIFICATION OF FIRST EMBODIMENT

Fig.11

SECOND EMBODIMENT

Fig.12

G-G FRAGMENTARY VIEW

Fig.13

FIRST MODIFICATION OF SECOND EMBODIMENT

Fig.14

SECOND MODIFICATION OF SECOND EMBODIMENT

Fig.15

H-H FRAGMENTARY VIEW

Fig.16

THIRD MODIFICATION OF SECOND EMBODIMENT

FUEL CELL VEHICLE

TECHNICAL FIELD

The present invention relates to the configuration of and the component layout in a fuel cell vehicle.

BACKGROUND ART

A proposed component layout of a fuel cell system for a fuel cell vehicle lays out various components under the floor of a passenger compartment of the vehicle, while assuring the sufficiently wide space for the passenger compartment (see, for example, JP-A-2006-36117).

The prior art component layout or the prior art configuration is, however, not sufficiently suitable for a fuel cell system including a fluid distributor designed to distribute a fluid in a vehicle width direction.

DISCLOSURE OF THE INVENTION

In order to solve the problem of the prior art discussed above, there would thus be a demand for providing a technique of actualizing an efficient component layout of a fuel cell system in a fuel cell vehicle.

The present invention accomplishes at least part of the demand mentioned above and the other relevant demands by a fuel cell vehicle having any of various configurations and arrangements discussed below.

According to one aspect, the invention is directed to a fuel cell vehicle. In the fuel cell vehicle of this aspect, a floor panel is constructed to have a center tunnel formed to extend in a front-rear direction of the vehicle. At least one fuel cell stack is provided below the floor panel to have fuel cells stacked in a vehicle width direction. A fluid distributor is provided below the floor panel to be at least partly located in the center tunnel and operative to distribute a supply of a fluid in the vehicle width direction to the fuel cell stack.

In the fuel cell vehicle according to this aspect of the invention, at least part of the fluid distributor used to distribute the supply of the fluid to the fuel cell stack is located in the center tunnel. Various fluid pipes attached to the fluid distributor can thus be efficiently located in the center tunnel. This arrangement desirably enhances the space efficiency. The arrangement of locating at least part of the fluid distributor in the center tunnel also allows the center tunnel to be efficiently used for various fluid pathways connecting with the fluid distributor.

In one preferable application of the fuel cell vehicle according to the above aspect of the invention, the fluid distributor is connected with a supply pipe and an exhaust pipe for a gaseous fuel to be supplied to and discharged from the fuel cell stack and with a cooling liquid discharge pipe for a cooling liquid used to cool down the fuel cell stack. The cooling liquid discharge pipe is located above at least one of the supply pipe and the exhaust pipe for the gaseous fuel in at least the center tunnel.

In one preferable embodiment of the fuel cell vehicle of the above application, the supply pipe and the exhaust pipe for the gaseous fuel include a fuel gas supply conduit, an anode off gas exhaust conduit, an oxidant gas supply conduit, and a cathode off gas exhaust conduit. The cooling liquid discharge pipe is located above at least one of the fuel gas supply conduit, the anode off gas exhaust conduit, the oxidant gas supply conduit, and the cathode off gas exhaust conduit.

In another preferable embodiment of the fuel cell vehicle of the above application, the fluid distributor is connected with a cooling liquid supply pipe arranged to supply the cooling liquid to the fuel cell stack. The cooling liquid supply pipe is located above at least one of a fuel gas supply conduit, an anode off gas exhaust conduit, an oxidant gas supply conduit, and a cathode off gas exhaust conduit in at least the center tunnel.

In the configuration of either of these embodiments, at least one pipe is located below the cooling liquid discharge pipe or the cooling liquid supply pipe. This arrangement enhances the safety. The location of the cooling liquid discharge pipe at a relatively high position advantageously accelerates release of air bubbles, which tend to float up to the higher position.

In the fuel cell vehicle having the configuration of either of the above embodiments, each of the oxidant gas supply conduit and the cathode off gas exhaust conduit may be provided with a valve activated to open in response to an increase of an in-pipe pressure. This arrangement effectively prevents corrosion caused by the inflow of the outside air to individual cathodes included in the fuel cell stack.

In the fuel cell vehicle having the configuration of either of the above embodiments, the cooling liquid discharge pipe may be located at a higher position than a position of the cooling liquid supply pipe. This arrangement enables the cooling liquid containing air bubbles to be smoothly flowed from the cooling liquid supply pipe to the cooling liquid discharge pipe.

In one preferable structure of the fuel cell vehicle having the configuration of either of the above embodiments, the anode off gas exhaust conduit has: a restriction element; and a valve activated in response to an increase of an in-pipe pressure to restrain a restricting function of the restriction element. This arrangement keeps the upstream pressure to prevent the back flow in the ordinary output condition with little emission of an anode off gas, while reducing the emission resistance in the high output condition with large emission of the anode off gas.

In another preferable application of the fuel cell vehicle according to the above aspect of the invention, at least one of a front end and a rear end of the center tunnel extended in the front-rear direction of the vehicle is open to outside of the center tunnel. For example, even in the event of leakage of hydrogen gas from the fluid distributor or the piping due to hydrogen permeation (through a metal material or a nonmetal material), this arrangement effectively prevents accumulation of the hydrogen gas in the center tunnel.

In one preferable embodiment of the fuel cell vehicle of the above application, the center tunnel is formed to have a greater height at a location closer to the at least one open end thereof from the fluid distributor. For example, even in the event of leakage of the hydrogen gas due to hydrogen permeation during a vehicle stop time or during a fuel cell inactive time, this arrangement enables the leaked hydrogen gas to be naturally introduced along the inclination of the center tunnel to the at least one open end.

In the fuel cell vehicle having the configuration of the above embodiment, the floor panel is formed to have a greater height at a location closer to the center tunnel in the vehicle width direction in at least an installation area of the fuel distributor in the front-rear direction of the vehicle. For example, even in the event of leakage of the hydrogen gas due to hydrogen permeation in the vicinity of the fuel cell stack, this arrangement enables the leaked hydrogen gas to be released out via the center tunnel, thus effectively preventing accumulation of the hydrogen gas.

In still another preferable application of the fuel cell vehicle according to the above aspect of the invention, multiple fuel cell stacks constructed to receive the distributive supply of the fluid from the fluid distributor are located across the fluid distributor in the vehicle width direction below the floor panel. This arrangement attains the midengine-like arrangement and allows substantial equalization of the weight balance (first moment of inertia and second moment of inertia) between the left side and the right side.

In one preferable embodiment according to the present invention, the fuel cell vehicle further has a drive system configured to drive the vehicle. An electric power controller is provided to supply electric power, which is generated by and is output from the fuel cell stack, to the drive system. An electric power supply circuit is located at least partly inside the center tunnel to include an electric power line operative to electrically connect the electric power controller with the fuel cell stack and a relay operative to shut off the electrical connection. The relay is accessible downward from the center tunnel.

The fuel cell vehicle of this embodiment advantageously utilizes the shutoff function of the relay, which is readily accessible downward from the floor panel, to improve the maintenance performance. The use of the relay causes the electric power line to be laid out in the center tunnel. Even in the event of an accidental or unintended access to the electric power line according to a wrong maintenance procedure, this arrangement effectively lowers the potential for electrical shock. Namely the fuel cell vehicle of this embodiment assures the fail safe function. The layout of this embodiment combines the easy accessibility to the relay with the difficulty in access to the electric power line, thus achieving a balance between the safety and the maintenance performance at an extremely high level.

In another preferable embodiment according to the present invention, the fuel cell vehicle further has an electrical component electrically connected with the fuel cell stack and located on the fuel cell stack. This arrangement locates the electrical component at a position that is not readily accessible upward. Even on the occurrence of electrical leakage in the electrical component, this arrangement effectively lowers the potential for electrical shock and thereby assures the fail safe function. This arrangement also lowers the potential for making the electrical component submerged in water, even when the vehicle is covered with water.

According to another aspect, the invention is also directed to another fuel cell vehicle including: a seat; a rear panel provided on a rear side of the seat; and at least one fuel cell stack arranged behind the rear panel.

The fuel cell vehicle according to this aspect of the invention effectively utilizes the space behind the rear panel to install the fuel cell stack, thus assuring a sufficiently wide space for the passenger compartment of the vehicle.

In one preferable application of the fuel cell vehicle according to this aspect of the invention, the fuel cell stack is inclined in a substantially identical direction with a direction of inclination of the rear panel. This arrangement allows efficient use of the space behind the rear panel, while effectively preventing accumulation of a fluid in an internal manifold formed inside the fuel cell stack.

In another preferable application of the fuel cell vehicle according to the above aspect of the invention, the fuel cell stack has fuel cells stacked in a direction approximate to a vertical direction of the vehicle rather than a front-rear direction of the vehicle and a vehicle width direction. Internal manifolds formed in the stacking direction inside the fuel cell stack are not horizontally arranged, irrespective of inclination of the vehicle. This arrangement advantageously prevents accumulation of produced water.

In one preferable embodiment of the fuel cell vehicle of the above application, the fuel cell stack is equipped with a cathode off gas exhaust conduit on a lower end thereof to discharge an exhaust of an oxidant gas. This arrangement enables the water produced on respective cathodes included in the fuel cell stack to be smoothly discharged from the lower end of the fuel cell stack.

According to still another aspect, the invention is further directed to still another fuel cell vehicle configured to include a passenger compartment and a fuel cell system. The passenger compartment has a floor panel constructed to have a center tunnel formed in a center area of a vehicle width direction to extend in a front-back direction of the vehicle. The fuel cell system is at least partly located below the center tunnel and includes at least one fuel cell stack and a hydrogen gas supply assembly configured to supply a hydrogen gas to the fuel cell stack. At least one of a front end and a rear end of the center tunnel extended in the front-rear direction of the vehicle is open to outside of the center tunnel. The center tunnel is continuously inclined to have a greater height at a location closer to the at least one open end thereof.

In the fuel cell vehicle according to this aspect of the invention, at least one of the front end and the rear end of the center tunnel extended in the front-rear direction of the vehicle is open to the outside of the center tunnel. The center tunnel is continuously inclined to have the greater height at the location closer to the at least one open end thereof. For example, in the event of leakage of the hydrogen gas due to hydrogen permeation during a fuel cell inactive time or during a long storage time, this arrangement effectively prevents accumulation of the hydrogen gas in the center tunnel.

In one preferable application of the fuel cell vehicle according to the above aspect of the invention, the front end of the center tunnel is open to the outside of the center tunnel. The fuel cell vehicle has a hood with an opening formed at a higher position than the open front end of the center tunnel and designed to communicate with outside of the vehicle. The hood is designed to have a continuous inclination from the open front end of the center tunnel to the opening of the hood. For example, in the event of leakage of the hydrogen gas during a fuel cell inactive time or during a long storage time, this arrangement advantageously enables the leaked hydrogen gas to be smoothly introduced from the center tunnel and discharged outside of the vehicle.

In another preferable application of the fuel cell vehicle according to the above aspect of the invention, the floor panel is formed to have a greater height at a location closer to the center tunnel in the vehicle width direction in at least an installation area of the fuel cell stack in the front-rear direction of the vehicle. For example, in the event of leakage of the hydrogen gas during a fuel cell inactive time or during a long storage time, this arrangement advantageously enables the leaked hydrogen gas to be smoothly introduced from outside of the center tunnel into the center tunnel and released out.

The technique of the invention is actualized by diversity of other applications including a fuel cell system mounting method and a vehicle configuration for mounting a fuel cell system.

BEST MODES OF CARRYING OUT THE INVENTION

Some modes of carrying out the invention are discussed below as preferred embodiments with reference to the accompanied drawings.

A. Component Layout of Fuel Cell System in First Embodiment of the Invention

Figure 1:
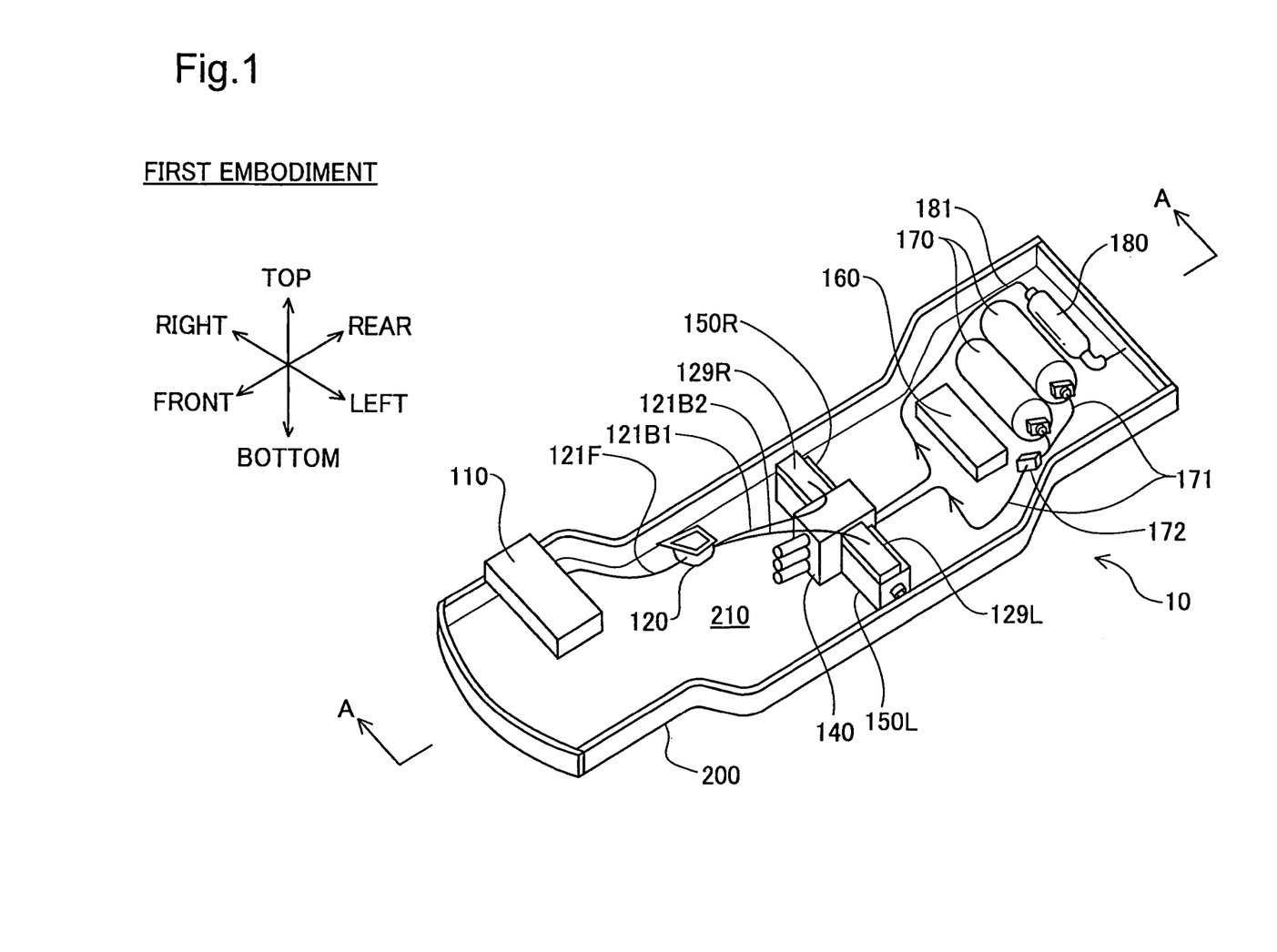
FIG. 1 is an explanatory view showing the configuration of a chassis 10 of a fuel cell vehicle in a first embodiment of the invention.

FIG. 1 is an explanatory view illustrating the configuration of a chassis 10 of a fuel cell vehicle or a vehicle equipped with a fuel cell system in a first embodiment of the invention. The chassis 10 includes a frame 200, a floor panel 210, a power control unit 110, two hydrogen tanks 170, a secondary battery 160, a high voltage relay box casing 120, a muffler 180, a fluid distributor 140, two fuel cell stacks 150L and 150R, and two high voltage components 129L and 129R.

A fuel gas (hydrogen gas) supplied from the two hydrogen tanks 170 goes through a hydrogen supply conduit 171 and a regulator 172 and enters the fluid distributor 140. The fluid distributor 140 distributes the supply of the fuel gas into individual anodes (not shown) included in the two fuel cell stacks 150L and 150R that are respectively connected with a left side and a right side of the fluid distributor 140. An anode off gas from the two fuel cell stacks 150L and 150R goes through an anode off gas exhaust conduit 181 and the muffler 180 and is discharged out of the vehicle.

Figure 2:
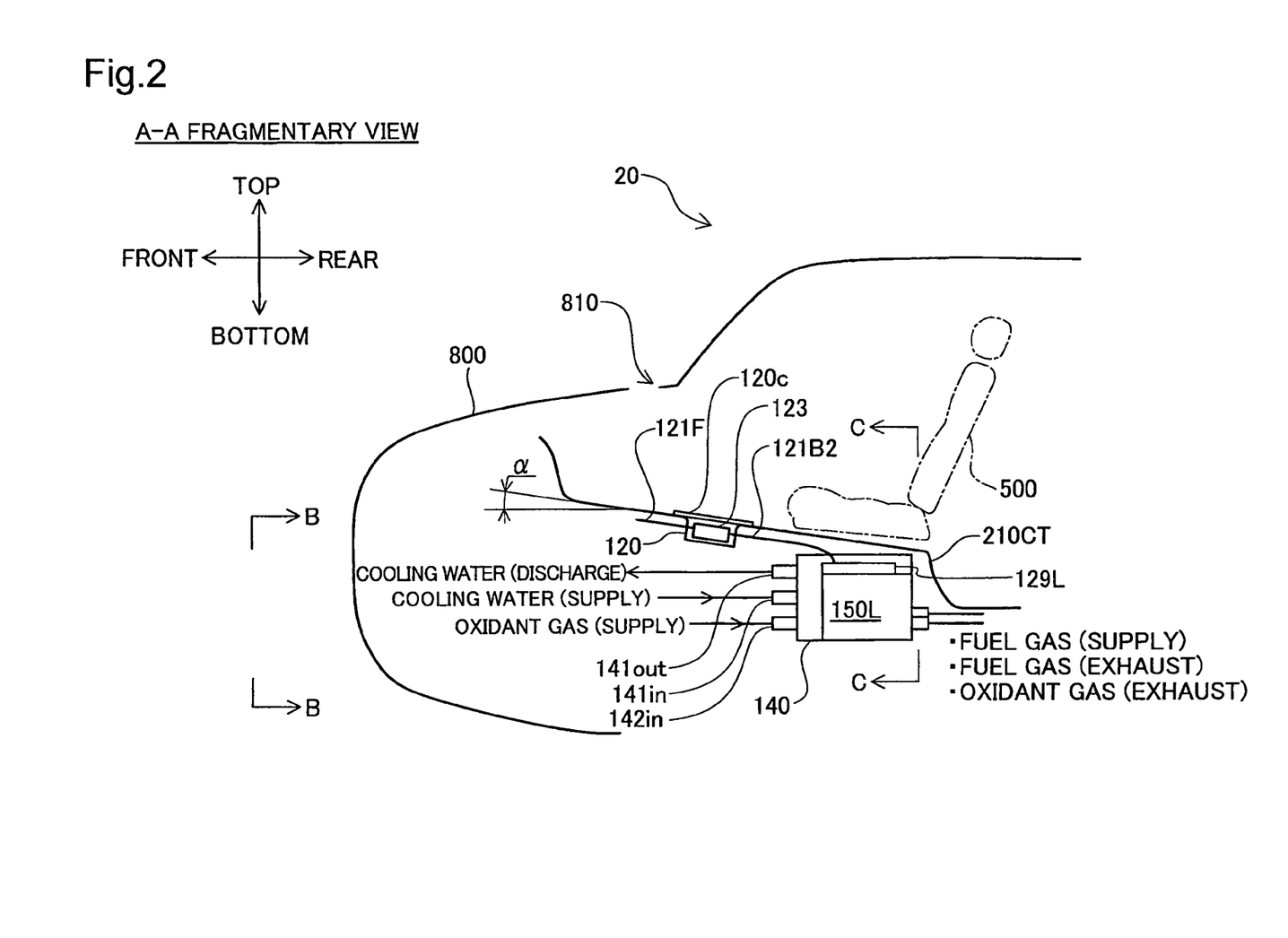
FIG. 2 is a fragmentary view of the chassis 10, taken on an arrow A-A.

FIG. 2 is a fragmentary view showing a fuel cell vehicle 20, taken on an arrow A-A. The A-A fragmentary view shows the cross section of a center tunnel 210CT formed in a central area of the floor panel 210 in a vehicle width direction (left-right direction of FIG. 1), with the fluid distributor 140, the fuel cell stack 150L connected with the left side of the fluid distributor 140, and the high voltage component 129L mounted on the fuel cell stack 150L. As illustrated, the high voltage component 129L is located in the vicinity of the fuel cell stack 150L. The high voltage component 129L has a cell monitor (not shown) for monitoring potentials (partly a high potential) of respective internal electrodes (not shown).

The high voltage components 129L and 129R are respectively located on the fuel cell stacks 150L and 150R. Such positioning effectively prevents any accidental or unintended access upward to the high voltage components 129L and 129R. The restricted upward access to the high voltage components 129L and 129R effectively lowers the potential for electrical shock even in the event of an electrical leakage in the high voltage component 129L or 129R in combination with the user's wrong maintenance procedure. Namely this layout assures the fail safe function. Another advantage of this layout is lowering the potential for making the high voltage components 129L and 129R submerged in water even when the vehicle is covered with water.

The high voltage components 129L and 129R are electrically connected with the power control unit 110 (FIG. 1) via a high voltage relay box 123 having the shutoff function. More specifically, the power control unit 110 is connected with the high voltage relay box 123 by a high voltage cable 121F (FIGS. 1 and 2), while the two high voltage components 129R and 129L are respectively connected with the high voltage relay box 123 by high voltage cables 121B1 and 121B2. The connection lines with the two high voltage components 129R and 129L may be joined together to one connection line inside the high voltage relay box casing 120 to be connected with the high voltage cable 121F.

Such indirect connection via the high voltage relay box 123 separates the connection line on the side of the power control unit 110 (high voltage cable 121F) from the connection line on the side of the fuel cell stacks 150L and 150R (high voltage cables 121B1 and 121B2) to facilitate wiring. The layout of the embodiment has the extremely high efficiency of wiring. In the component layout of this embodiment, there is a large distance between the power control unit 110 and the two high voltage components 129L and 129R. The separate connection via the high voltage relay box 123 does not require laying a long high voltage cable but ensures the high workability.

The use of the high voltage relay box 123, which is accessible downward from the floor panel 210 and has the shutoff function, advantageously improves the maintenance performance. The connection via the high voltage relay box 123 causes the wiring of the high voltage cables 121F, 121B1, and 121B2 to be located above the center tunnel 210CT. Even if a wrong maintenance procedure causes an unintended access to any of the high voltage cables 121F, 121B1, and 121B2 with the possibility for electrical leakage, this layout effectively prevents potential electrification by shutoff of electric power and thus assures the high fail safe function.

The high voltage relay box 123 is located inside the high voltage relay box casing 120 mounted on the center tunnel 210CT. The high voltage relay box casing 120 is attached to the center tunnel 210CT to have water tightness (or waterproof). The chassis 10 may be designed to prevent the high voltage relay box 123 from being exposed to water, even if the chassis 10 is submerged in water to the position of the high voltage relay box casing 120. The high voltage relay box casing 120 is readily accessible downward from the floor panel 210 by simple removal of a high voltage relay box cover 120c.

The positioning of the high voltage relay box 123 in the embodiment combines the easy accessibility to the high voltage relay box 123 with the difficulty in access to the high voltage cables 121F, 121B1, and 121B2, thus achieving a balance between the safety and the maintenance performance at an extremely high level.

The center tunnel 210CT is continuously inclined upward at angle α from the position above the fluid distributor 140 to the vehicle front and is open at its front end to the outside as shown in FIG. 2. This inclined and open-end design of the center tunnel 210CT effectively prevents accumulation of leaked hydrogen gas during both the operation time and the stop time of the chassis 10. This simple structure enables the hydrogen gas that may be leaked by hydrogen permeation to be naturally introduced forward along the slope of the center tunnel 210CT and released out.

The hydrogen gas introduced forward along the slope of the center tunnel 210CT and released out reaches inside a hood 800 at the higher position than the release position. The hydrogen gas reaching inside the hood 800 moves along a continuous slope of the hood 800 to an opening 810 formed in the hood 800 and is released through the opening 810 to outside the fuel cell vehicle 20. The component layout of the first embodiment advantageous enables the hydrogen gas, which may be leaked during the stop time of the fuel cell vehicle 20, to be smoothly introduced outside the fuel cell vehicle 20.

The inclination of the center tunnel 210CT or the inclination of the hood 800 is not essential characteristic of the invention. Accumulation of hydrogen gas may be prevented by another method, for example, setting a hydrogen gas discharge route or providing hydrogen gas discharge equipment. This inclined design is not restrictively applied to the configuration using the fluid distributor 140 but is also applicable to a modified configuration without using the fluid distributor 140. The inclined design effectively prevents accumulation of hydrogen gas in the modified configuration by smoothly introducing and releasing the hydrogen gas that may be leaked from the hydrogen gas supply system including the fuel cell stacks 150L and 150R, the hydrogen supply conduit 171, and the regulator 172.

Figure 3:
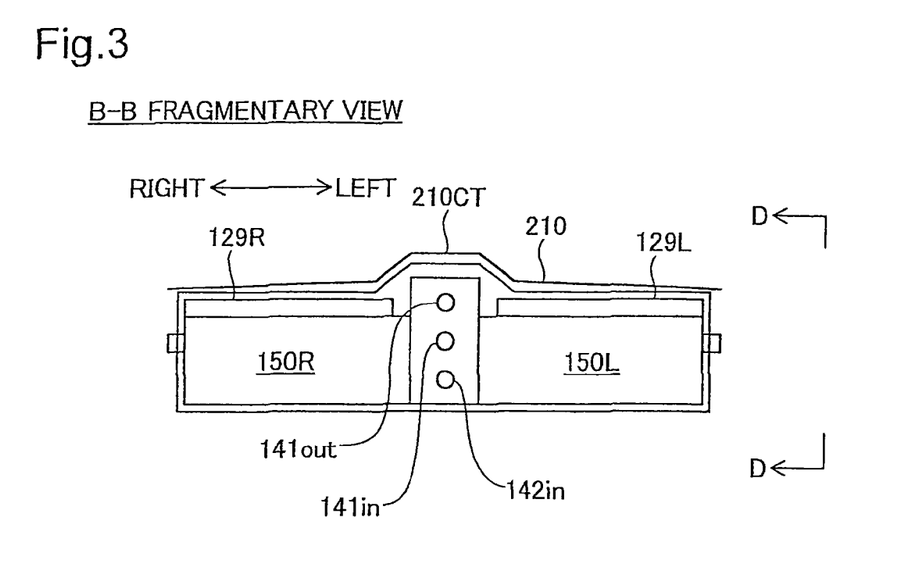
FIG. 3 is a fragmentary view of the chassis 10, taken on an arrow B-B, showing fuel cell stacks and their periphery from a front side.

FIG. 3 is a fragmentary view of the chassis 10, taken on an arrow B-B in FIG. 2. The B-B fragmentary view shows the fuel cell stacks 150L and 150R and their periphery from the front side. The fluid distributor 140 has a cooling water discharge port 141out, a cooling water supply port 141in, and an oxidant gas supply port 142in, which face the vehicle front and are located in this order from the top to the bottom in a vertical direction. The cooling water discharge port 141out generally has the higher temperature than those of the other ports and is located above the cooling water supply port 141in and the oxidant gas supply port 142in. This arrangement enhances the safety and accelerates release of air bubbles from the fuel cell stacks 150L and 150R.

The enhancement of the safety is ascribed to the following reason. The cooling water discharge port 141out is located above the cooling water supply port 141in and the oxidant gas supply port 142in. A piping connecting with the cooling water discharge port 141out can be located at the higher position than those of a piping connecting with the cooling water supply port 141in and a piping connecting with the oxidant gas supply port 142in at least in the center tunnel 210CT, which are not specifically illustrated. This arrangement causes the cooling water discharge port 141out to be accessible only after detachment of both the cooling water supply port 141in and the oxidant gas supply port 142in.

The enhancement of the safety and the acceleration of release of air bubbles may generally be actualized in a layout where the cooling water discharge port 141out is located above at least one of the oxidant gas supply port 142in, a cathode off gas exhaust port 142out, a hydrogen gas supply port 143 in, and an anode off gas exhaust port 143out. The cooling water supply port 141in generally does not tend to be as hot as the cooling water discharge port 141out but has the possibility of having the higher temperature than those of the other ports but the cooling water discharge port 141out. It is thus preferable to arrange the cooling water supply port 141in like the cooling water discharge port 141out by taking into account such possibility.

The acceleration of the release of air bubbles from the fuel cell stacks 150L and 150R is ascribed to the following reason. The arrangement of the cooling water discharge port 141out at the relatively high position accelerates release of air bubbles, which tend to float up to the higher position. The acceleration of the release of air bubbles will be discussed more in detail later.

The floor panel 210 is formed to become higher from the left and the right ends toward the center tunnel 210CT as clearly shown in FIG. 3. The presence of such inclination enables hydrogen gas that may be leaked, for example, by hydrogen permeation in the vicinity of the two fuel cell stacks 150L and 150R to be naturally collected in the center tunnel 210CT and thereby effectively prevents accumulation of the hydrogen gas. The hydrogen gas flowing into the center tunnel 210CT moves forward along the slope of the center tunnel 210CT and is released outside the center tunnel 210CT.

Figure 4:
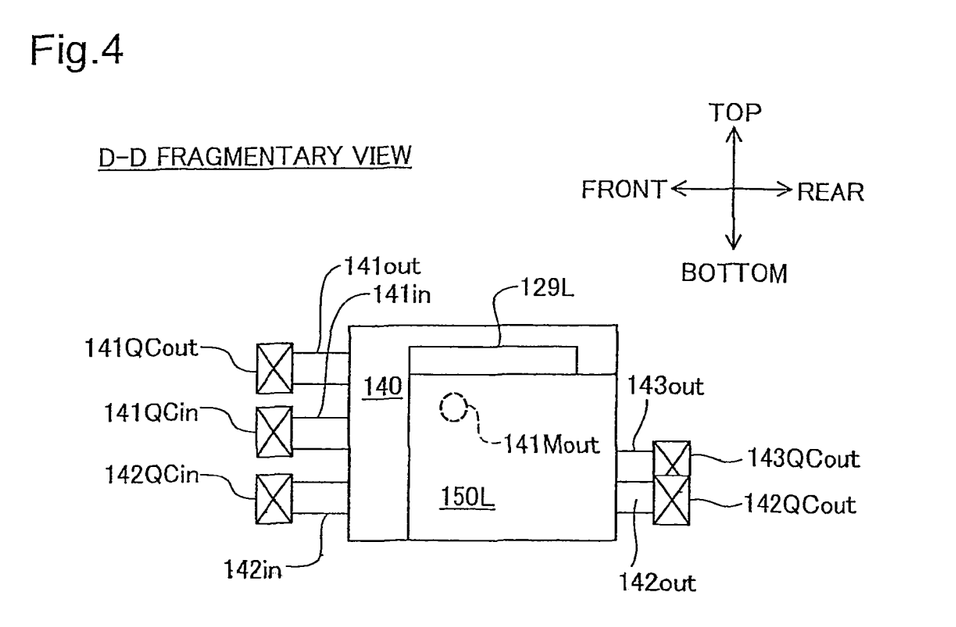
FIG. 4 is a fragmentary view of the chassis 10, taken on an arrow D-D, showing a fluid distributor, one of the fuel cell stacks, and a high voltage component from a left side of the chassis 10.

FIG. 4 is a fragmentary view of the chassis 10, taken on an arrow D-D in FIG. 3. The D-D fragmentary view shows the fluid distributor 140, the fuel cell stack 150L, and the high voltage component 129L from the left side of the chassis 10 (FIG. 1). The fuel cell stack 150L has a cooling water discharge manifold 141Mout formed inside thereof. The arrangement of the cooling water discharge manifold 141Mout at a relatively high position in the fuel cell stack 150L (in a vertical direction or in a direction of gravity) causes air bubbles generated inside the fuel cell stack 150L to be smoothly introduced through the cooling water discharge manifold 141Mout.

The cooling water discharge port 141out is located at the higher position than the cooling water discharge manifold 141Mout. A flow path of the cooling water in the fluid distributor 140 is thus laid to smoothly introduce the air bubbles generated in the fuel cell stack 150L to the cooling water discharge port 141out. A cooling water flow conduit (not shown) connecting the cooling water discharge port 141out with a radiator (not shown) is designed to be extended along the center tunnel 210CT continuously inclined upward from the position above the fluid distributor 140 to the vehicle front. The layout of this cooling water flow conduit also ensures smooth release of the air bubbles. This arrangement of the embodiment desirably prevents the cooling performance from being lowered due to the generated air bubbles. In the component layout of this embodiment, the positional relation in the vertical direction is not readily changed even in an inclined state of the chassis 10. Namely the component layout of this embodiment advantageously has the resistance specifically against inclination of the chassis 10.

Figure 5:
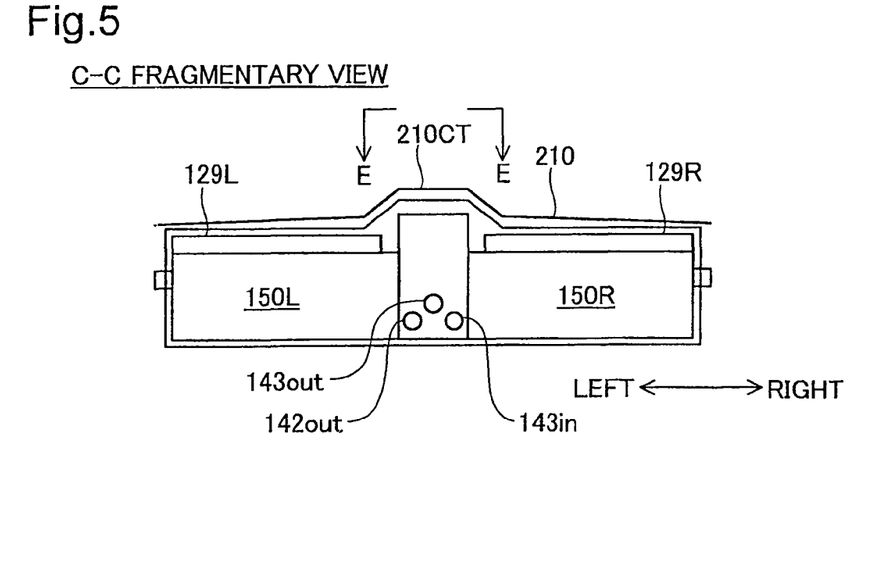
FIG. 5 is a fragmentary view of the chassis 10, taken on an arrow C-C, showing the fuel cell stacks and their periphery from a rear side.
Figure 6:
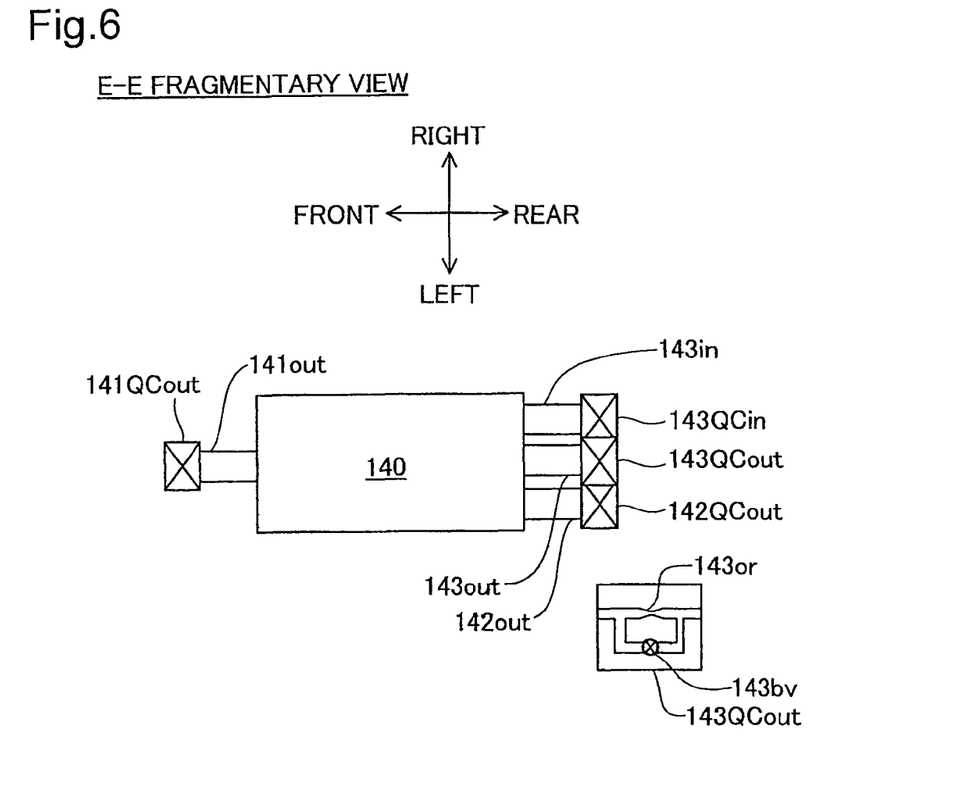
FIG. 6 is a fragmentary view of the chassis, taken on an arrow E-E, showing the fluid distributor, the fuel cell stack, and the high voltage component from a top side of the chassis 10.

FIG. 5 is a fragmentary view of the chassis 10, taken on an arrow C-C in FIG. 2. The C-C fragmentary view shows the fuel cell stacks 150L and 150R and their periphery from the rear side. FIG. 6 is a fragmentary view of the chassis, taken on an arrow E-E in FIG. 5. The E-E fragmentary view shows the fluid distributor 140 from the top side of the chassis 10 (FIG. 1). As clearly shown in FIGS. 3 through 6, the fluid distributor 140 has six quick connectors 141QCin, 141QCout, 142QCin, 142QCout, 143QCin, and 143QCout that are used for easy attachment to and detachment from connections with external pipes (not shown).

The quick connectors 141QCout and 141QCin provided on the front side of the fluid distributor 140 (FIGS. 3 and 4) are respectively connected to a discharge pipe and a supply pipe (not shown) in the cooling water system.

The quick connector 142QCin provided on the front side of the fluid distributor 140 and the quick connection 142QCout provided on the rear side of the fluid distributor 140 (FIGS. 3 and 4) are respectively connected to a supply pipe and an exhaust pipe (not shown) in the oxidant gas system (air system). The two quick connectors 142QCin and 142QCout both have the shutoff function and are activated to open only in response to application of pressure of the oxidant gas. The shutoff function effectively prevents corrosion caused by invasion of the outside air in the inactive condition of the fuel cell stacks 150L and 150R.

The quick connectors 143QCin and 143QCout provided on the rear side of the fluid distributor 140 (FIGS. 5 and 6) are respectively connected to a supply pipe and an exhaust pipe (not shown) in the fuel gas system (hydrogen gas system). The quick connector 143QCout for exhaust of the anode off gas has an orifice 143 or and a valve 143bv that is used to bypass the orifice 143 or and thereby restrain or inactivate the restricting function. The restricting function of the orifice 143 or keeps the pressure in the upstream of the quick connector 143QCout and prevents the back flow in the ordinary output condition with little emission of the anode off gas. The valve 143bv is open at an upstream pressure level of or over a preset reference value. Opening the valve 143bv restrains or inactivates the restricting function to lower the emission resistance of the anode off gas from the quick connector 143QCout in the high output condition with high emission of the anode off gas.

In the configuration of the first embodiment described above, the respective components relevant to the fuel cell system are laid out from the total standpoint of accelerating the release of the air from the cooling water and the release of hydrogen and of improving the mounting performance and the maintenance performance of high voltage wirings. The fuel cell stacks 150L and 150R having relatively large weights are located in the substantial center of the chassis 10 to attain the midengine-like arrangement. This midengine-like arrangement improves the maneuverability of the fuel cell vehicle. The substantially symmetrical arrangement of the fuel cell stacks 150L and 150R on the left side and the right side of the fluid distributor 140 equalizes the weight balance (first moment of inertia and second moment of inertia) between the left side and the right side.

Such symmetrical arrangement of the fuel cell stacks 150L and 150R on the left side and the right side of the fluid distributor 140 is, however, not essential characteristic of the invention. In one modified layout, the fuel cell stack 150L may be provided on one side of the fluid distributor 140, while auxiliary machinery (not shown) for the fuel cell stack 150L may be provided on the other side of the fluid distributor 140. This modification also attains the midengine-like arrangement and allows substantial equalization of the weight balance (first moment of inertia and second moment of inertia) between the left side and the right side.

Figure 7:
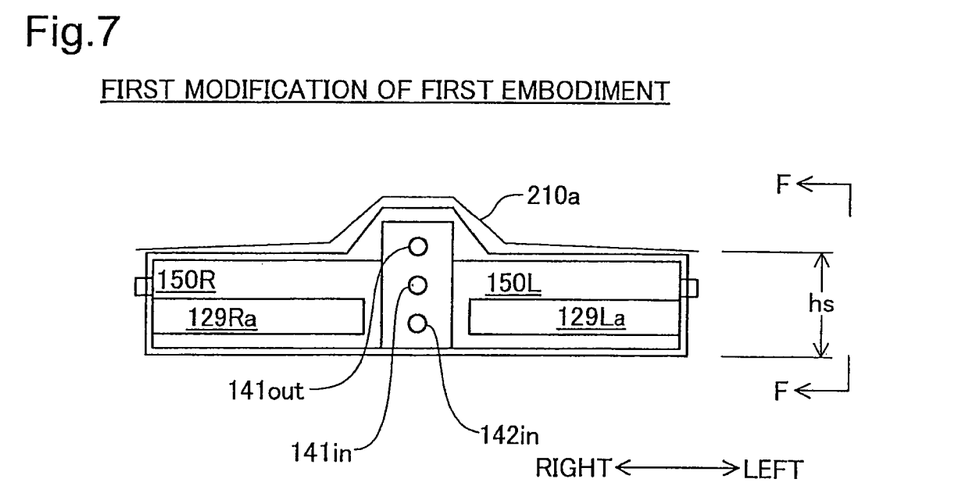
FIG. 7 is a an explanatory view showing the component layout of a fuel cell system in a first modification of the first embodiment.
Figure 8:
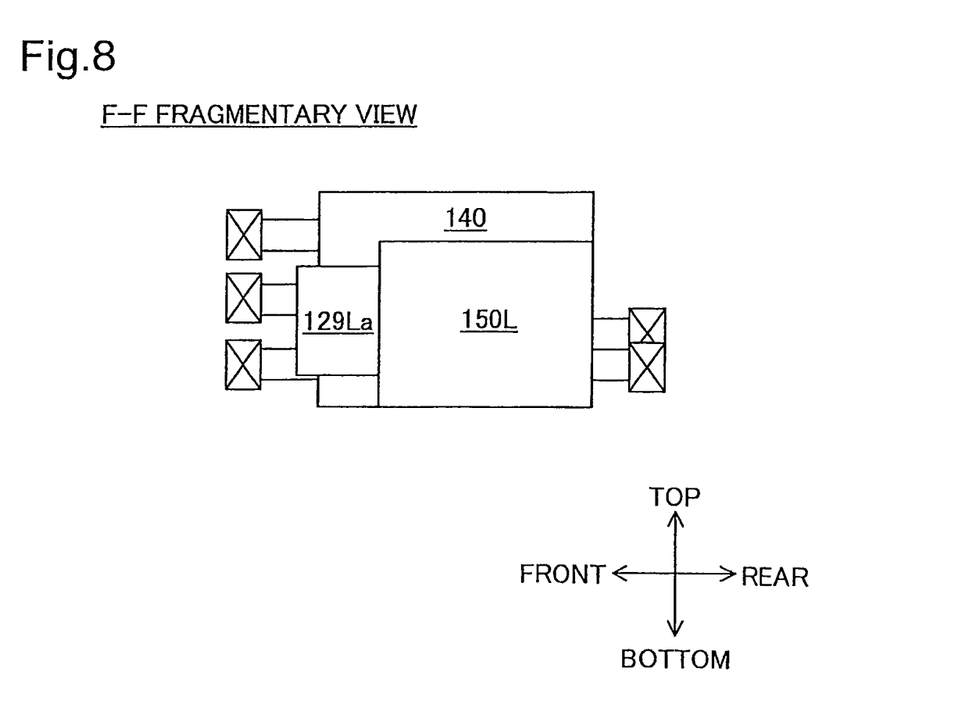
FIG. 8 is a fragmentary view of the chassis, taken on an arrow F-F, showing the fluid distributor, the fuel cell stack, and the high voltage component from a left side of the chassis 10 in the first modification of the first embodiment.

A-1. Component Layout of Fuel Cell System in First Modification of First Embodiment FIGS. 7 and 8 are explanatory views showing the component layout of a fuel cell system in a first modification of the first embodiment and correspond to FIGS. 3 and 4 of the first embodiment. The difference of the component layout of the first modification from that of the first embodiment is the location of the high voltage components 129L and 129R. In the structure of the first embodiment, the high voltage components 129L and 129R are located on the fuel cell stacks 150L and 150R. In the structure of the first modification, on the other hand, high voltage components 129La and 129Ra have different shapes and are respectively located in front of the fuel cell stacks 150L and 150R.

This modified component layout advantageously reduces an underfloor height 'hs' required for mounting the fuel cell stacks 150L and 150R and the high voltage components 129La and 129Ra.

Figure 9:
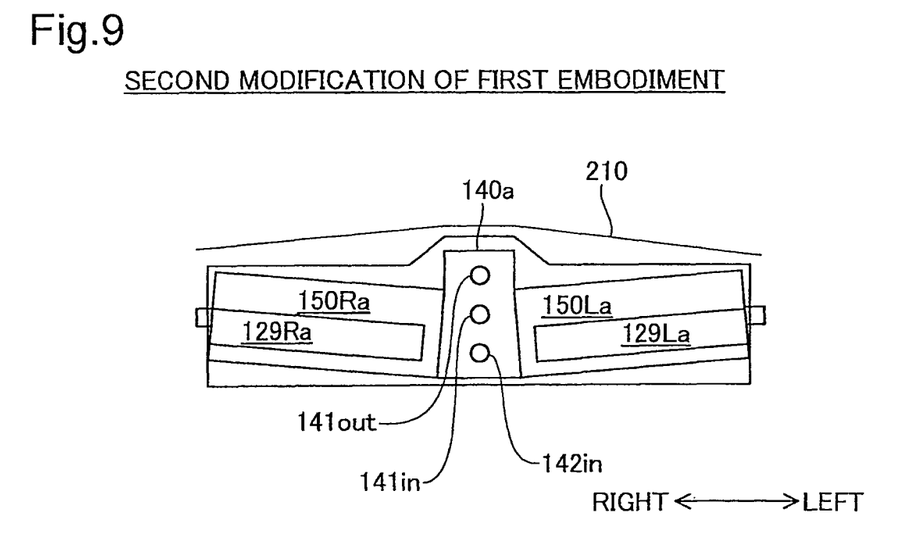
FIG. 9 is an explanatory view showing the component layout of a fuel cell system in a second modification of the first embodiment.

A-2. Component Layout of Fuel Cell System in Second Modification of First Embodiment FIG. 9 is an explanatory view showing the component layout of a fuel cell system in a second modification of the first embodiment and corresponds to FIG. 3 of the first embodiment. The difference of the component layout of the second modification from that of the first embodiment is the inclined arrangement of fuel cell stacks 150La and 150Ra. The fuel cell stacks 150La and 150Ra are arranged to have less heights on their respective sides connecting with a fluid distributor 140a of the second modification. The fluid distributor 140a of the second modification has a specific wedge-like shape corresponding to this inclined design.

This modified component layout advantageously enables a fluid flowing internal manifolds (not shown) formed inside the fuel cell stacks 150La and 150Ra having fuel cells stacked in the vehicle width direction of the chassis 10 to be smoothly returned to the fluid distributor 140a. In the configuration of the second modification, the inclined design of the fuel cell stacks 150La and 150Ra tends to increase the required underfloor height. It is accordingly preferable to combine the second modification with the first modification that allows reduction of the required underfloor height 'hs'.

Figure 10:
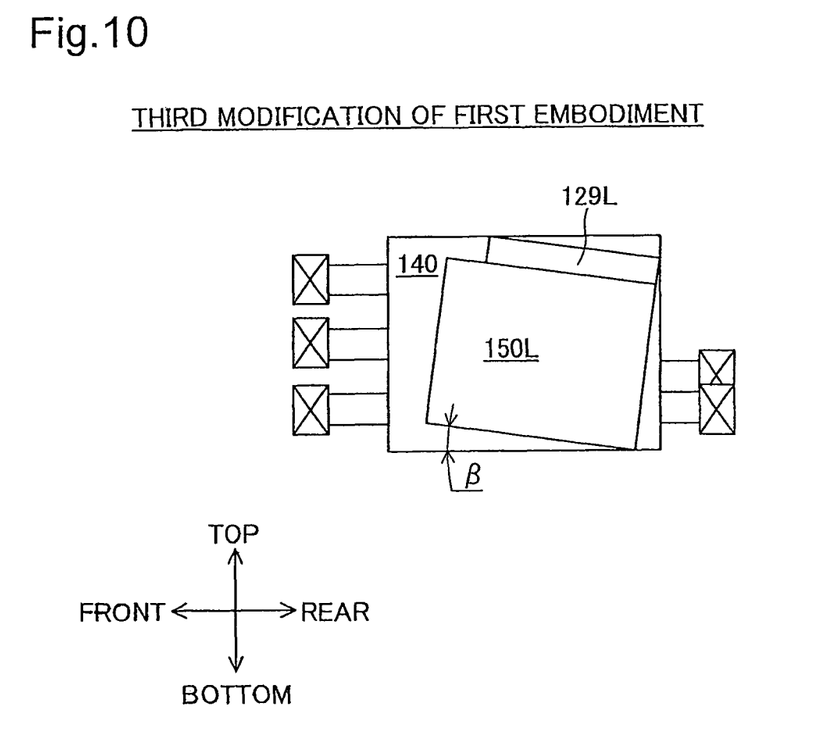
FIG. 10 is an explanatory view showing the component layout of a fuel cell system in a third modification of the first embodiment.

A-3. Component Layout of Fuel Cell System in Third Modification of First Embodiment FIG. 10 is an explanatory view showing the component layout of a fuel cell system in a third modification of the first embodiment and corresponds to FIG. 4 of the first embodiment. The difference of the component layout of the third modification from that of the first embodiment is the mounting angle of the fuel cell stacks 150La and 150Ra (the fuel cell stacks 150L and 150R). The fuel cell stacks 150L and 150R are rotated β degrees about a stacking direction and mounted in an inclined orientation.

The principle of the first embodiment is applicable to the component layout of the third modification. Namely the principle of the first embodiment is applicable to any combinations of the first through the third modifications.

Figure 11:
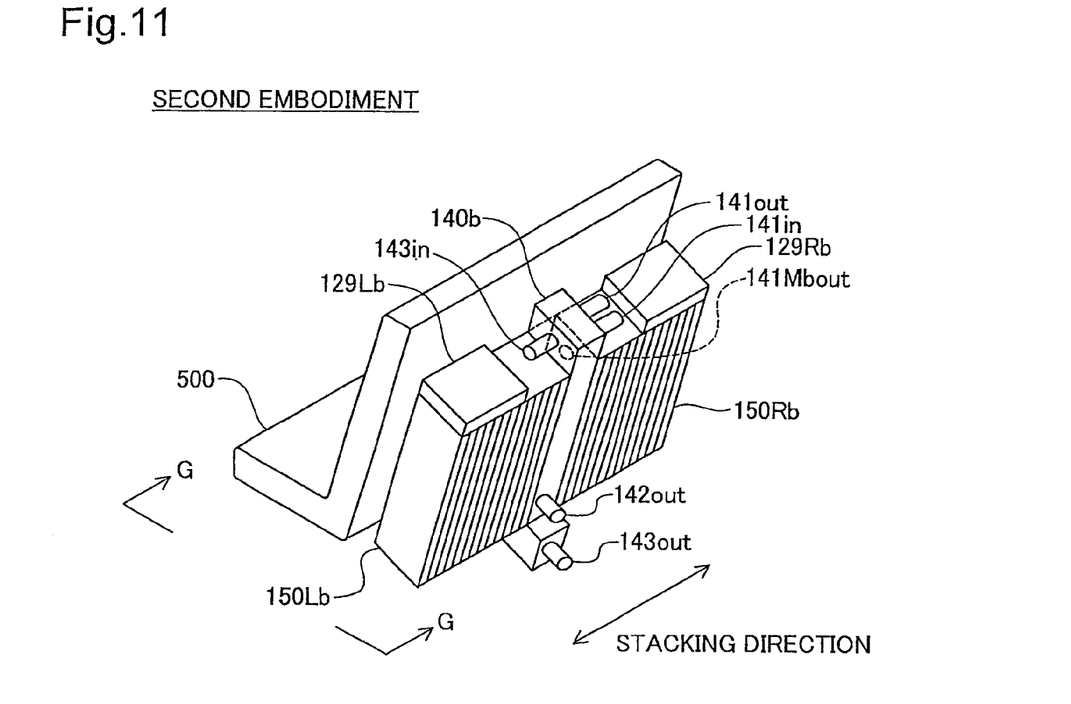
FIG. 11 is an explanatory view illustrating the component layout of a fuel cell system in a second embodiment of the invention.
Figure 12:
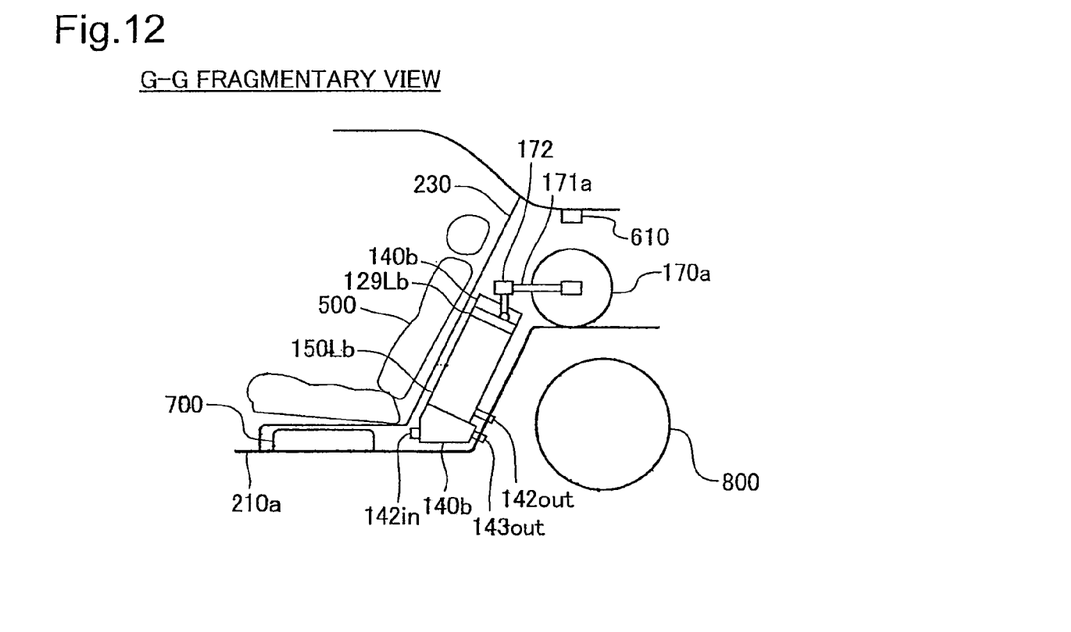
FIG. 12 is a fragmentary view, taken on an arrow G-G in FIG. 11, illustrating the component layout of the fuel cell system in the second embodiment of the invention.

B. Component Layout of Fuel Cell System in Second Embodiment of the Invention FIGS. 11 and 12 are explanatory views illustrating the component layout of a fuel cell system in a second embodiment of the invention. The difference of the component layout of the second embodiment from that of the first embodiment is that two fuel cell stacks 150Lb and 150Rb having fuel cells stacked in the vehicle width direction of the chassis 10 are located behind a rear panel 230 provided on the rear side of a seat 500 and are inclined to the stacking direction along an inclination of the rear panel 230. The two fuel cell stacks 150Lb and 150Rb are respectively connected with a left side and a right side of a fluid distributor 140b that is also provided behind the rear panel 230 in an inclined orientation. The substantially symmetrical arrangement of the fuel cell stacks 150Lb and 150Rb on the left side and the right side of the fluid distributor 140b equalizes the weight balance between the left side and the right side, like the component layout of the first embodiment discussed previously.

In the component layout of the second embodiment, a cooling water discharge port 141out is located close to an upper end of the fluid distributor 140b, and a cooling water discharge manifold 141Mbout (on the side of the fuel cell stack 150Rb) is located below the cooling water discharge port 141out. The arrangement of the cooling water discharge manifold 141Mbout at a relatively high position in the fuel cell stack 150Rb (in the vertical direction or in the direction of gravity) causes air bubbles generated inside the fuel cell stack 150Rb to be smoothly introduced through the cooling water discharge manifold 141Mbout, like the component layout of the first embodiment discussed previously. This advantage is similarly applied to the fuel cell stack 150Lb. In the component layout of the second embodiment, the positional relation in the vertical direction is not readily changed even in an inclined state of the chassis 10. Namely the component layout of this embodiment advantageously has the resistance specifically against inclination of the chassis 10, like the component layout of the first embodiment discussed previously.

In the component layout of the second embodiment, high voltage components 129Lb and 129Rb are respectively located on the fuel cell stacks 150Lb and 150Rb. Such positioning effectively lowers the potential for making the high voltage components 129Lb and 129Rb submerged in water even when the chassis 10 is covered with water. A fuel gas supply system including a hydrogen tank 170a, a hydrogen supply conduit 171a, and a regulator 172 are concentrated in one area. This arrangement advantageously shortens the hydrogen supply conduit 171 and prevents accumulation of hydrogen gas. A hydrogen detector 610 provided at only a single location effectively monitors any leakage of hydrogen gas from the fuel gas supply system.

The advantages of the second embodiment discussed above are obtainable by the arrangement of the two fuel cell stacks 150Lb and 150Rb behind the rear panel 230. The inclined orientation of the fuel cell stacks 150Lb and 150Rb and the rear panel 230 is thus not essential characteristic of the second embodiment. The inclined orientation, however, has the advantages of saving the space and preventing accumulation of a fluid in internal manifolds (not shown) formed inside the two fuel cell stacks 150Lb and 150Rb. In the component layout of the second embodiment, the two fuel cell stacks 150Lb and 150Rb and a secondary battery 700 are provided above a floor panel 210a. Such positioning effectively lowers the potential for making the two fuel cell stacks 150Lb and 150Rb and the secondary battery 700 submerged in water even when the chassis 10 is covered with water.

Figure 13:
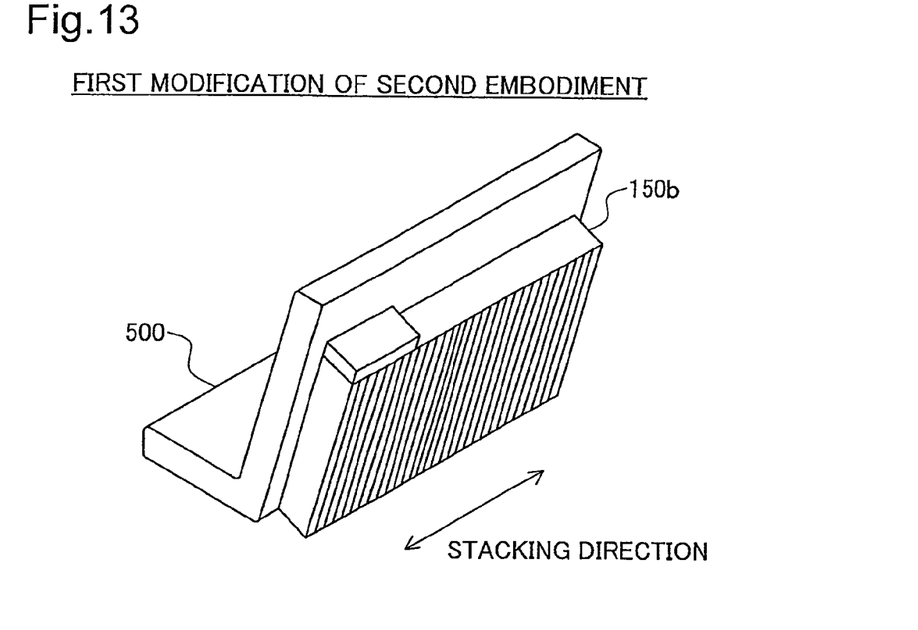
FIG. 13 is an explanatory view showing the component layout of a fuel cell system in a first modification of the second embodiment.

B-1. Component Layout of Fuel Cell System in First Modification of Second Embodiment FIG. 13 is an explanatory view showing the component layout of a fuel cell system in a first modification of the second embodiment. The difference of the component layout of the first modification from that of the second embodiment is that one single fuel cell stack 150b is provided on the substantial center in the vehicle width direction, in place of the two fuel cell stacks 150Lb and 150Rb. The component layout of the first modification does not include the fluid distributor 140b, so that each fluid, such as the fuel gas or the oxidant gas, is supplied from one end or both ends of the fuel cell stack 150b in its stacking direction. The characteristic arrangement of the fuel cell stack behind the rear panel 230 discussed above in the second embodiment is not restrictively applied to the component layout having the multiple fuel cell stacks located on both sides of the fluid distributor 140b but is also applicable to the component layout having the single fuel cell stack.

Figure 14:
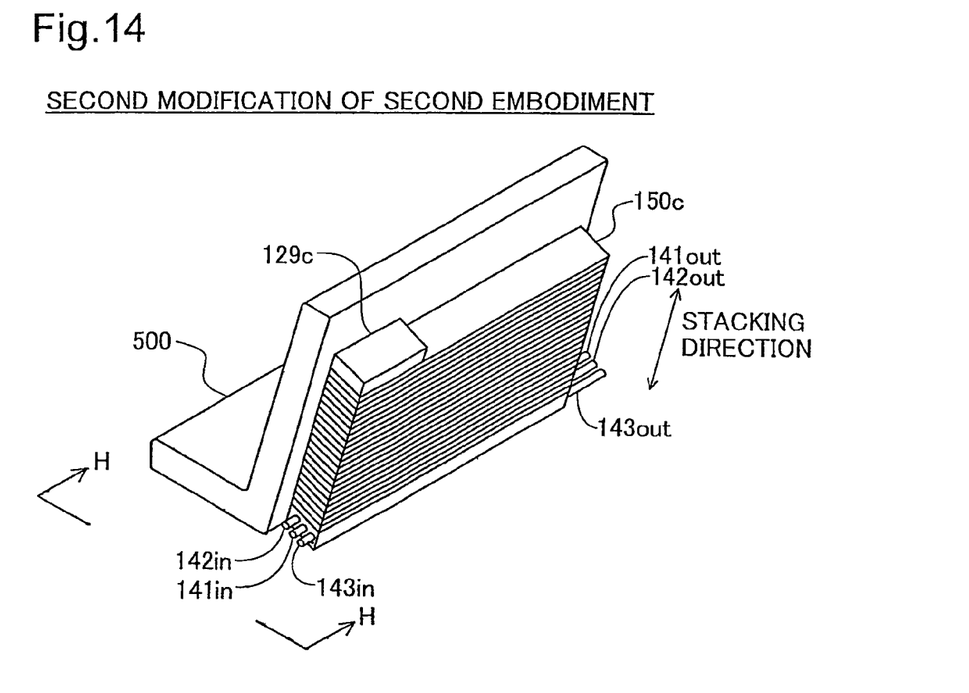
FIG. 14 is an explanatory view showing the component layout of the fuel cell system in the second modification of the second embodiment.
Figure 15:
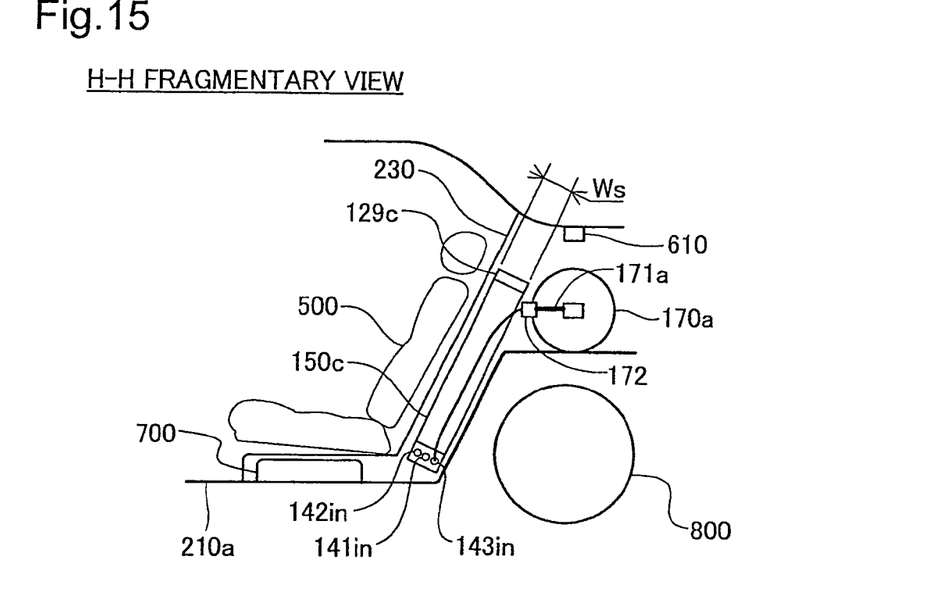
FIG. 15 is a fragmentary view, taken on an arrow H-H in FIG. 14, showing the component layout of the fuel cell system in the second modification of the second embodiment.

B-2. Component Layout of Fuel Cell System in Second Modification of Second Embodiment FIGS. 14 and 15 are explanatory views showing the component layout of a fuel cell system in a second modification of the second embodiment. In the component layout of the second modification, a fuel cell stack 150c is provided behind the rear panel 230 in an inclined orientation along the inclination of the rear panel 230, like the component layouts of the second embodiment and its first modification. The difference of the component layout of the second modification from those of the second embodiment and its first modification is that the stacking direction of the single fuel cell stack 150c is approximate to the vertical direction of the chassis 10 rather than the left-right direction of the chassis 10.

In the component layout of the 2nd modification of the second embodiment, the cooling water supply port 141in, the cooling water discharge port 141out, the oxidant gas supply port 142in, the cathode off gas exhaust port 142out, the hydrogen gas supply port 143 in, and the anode off gas exhaust port 143out are collectively located on a lower stacking end of the fuel cell stack 150c. A high voltage component 129c is located on an upper stacking end of the fuel cell stack 150c. Such positioning advantageously lowers the potential for making the high voltage component 129c submerged in water even when the chassis 10 is covered with water, like the advantage of the first embodiment discussed previously.

In the component layout of the 2nd modification, a thickness Ws of the fuel cell stack 150c is adjustable, since the output capacity of the fuel cell stack 150 can be kept at a required level by varying the number of fuel cells stacked in the fuel cell stack 150c. This characteristic enables the fuel cell stack 150c to be readily designed according to the space behind the rear panel 230. A relatively large space is extended in the vertical direction behind the rear panel 230 to allow for an increase in stacking number of fuel cells. This ensures reduction of the thickness Ws to give the wider space for the passenger compartment of the vehicle.

In the component layout of the second modification, the stacking direction of the fuel cell stack 150c is approximate to the vertical direction of the chassis 10 rather than a front-rear direction of the chassis 10 and the vehicle width direction. Internal manifolds (not shown) formed in the stacking direction inside the fuel cell stack 150 are not horizontally arranged, irrespective of inclination of the vehicle. This arrangement advantageously prevents accumulation of produced water. The cathode off gas exhaust port 142out is located on the lower stacking end of the fuel cell stack 150c. This arrangement advantageously enables water produced on respective cathodes (not shown) to be smoothly discharged out from the lower stacking end of the fuel cell stack 150c.

Figure 16:
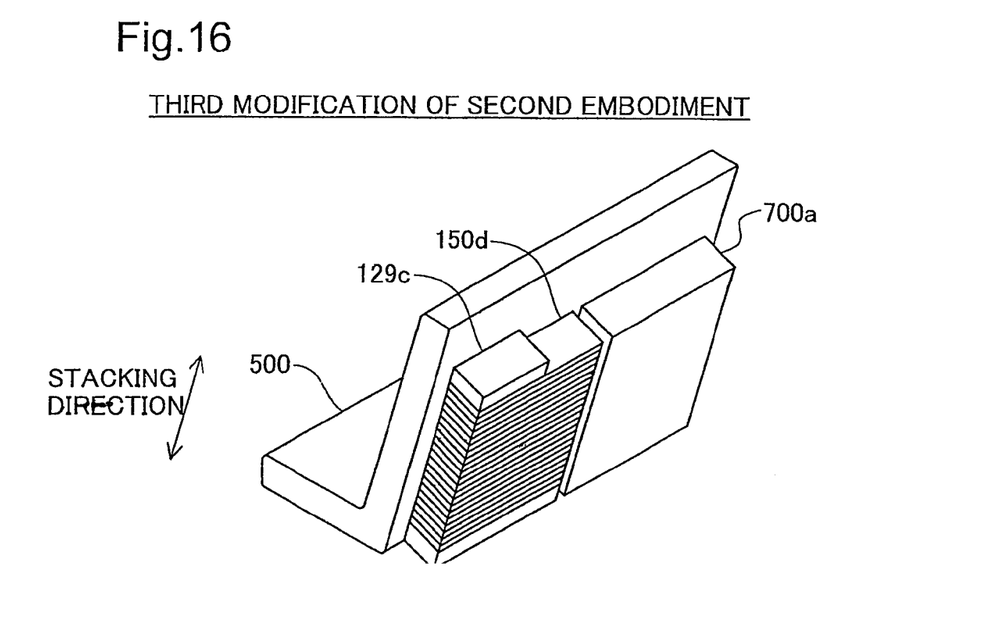
FIG. 16 is an explanatory view showing the component layout of a fuel cell system in a third modification of the second embodiment.

B-3. Component Layout of Fuel Cell System in Third Modification of Second Embodiment FIG. 16 is an explanatory view showing the component layout of a fuel cell system in a third modification of the second embodiment. In the component layout of the third modification, a fuel cell stack 150d is provided behind the rear panel 230 in an inclined orientation along the inclination of the rear panel 230 to have a stacking direction that is approximate to the vertical direction of the chassis 10 rather than the left-right direction of the chassis 10, like the component layout of the second modification discussed above. The difference of the component layout of the third modification from that of the second modification is that a secondary battery 700a is provided on the right side of the fuel cell stack 150d.

In the third modification, the roughly symmetrical arrangement of the fuel cell stack 150d and the secondary battery 700a substantially equalizes the weight balance between the left side and the right side. In this component layout, a hydrogen tank may be provided below a rear seat. Any of the secondary batteries 160, 700, and 700a may be a capacitor or another suitable accumulator.

C. Other Aspects

The embodiments and their applications discussed above are to be considered in all aspects as illustrative and not restrictive in any sense. There may be various modifications, changes, and alterations without departing from the scope or spirit of the main characteristics of the present invention. Among the various components included in the structures of the embodiments discussed above, the components other than those disclosed in independent claims are additional elements and may be omitted according to the requirements.

The invention claimed is:

1. A fuel cell vehicle, comprising:
    a fuel cell vehicle body with a floor panel configured to have a center tunnel formed to extend in a front-rear direction of the vehicle;
    a fluid distributor provided below the floor panel to be at least partly located in the center tunnel and operative to distribute a fluid in a vehicle width direction; and
    a plurality of fuel cell stacks provided below the floor panel, arranged across the fluid distributor to be disposed on respective sides of the fluid distributor in the vehicle width direction, and configured to receive a supply of the fluid from the fluid distributor, wherein
    each cell of a first fuel cell stack of the plurality of fuel cell stacks is stacked in the vehicle width direction with respect to every other cell of the first fuel cell stack,
    the fluid distributor is provided with a fuel gas supply pipe, an anode off-gas exhaust pipe, an oxidant gas supply pipe, a cathode off-gas exhaust pipe, a cooling liquid supply pipe and a cooling liquid discharge pipe, the cooling liquid supply pipe being arranged to supply cooling liquid to the fluid distributor and not being directly connected to the plurality of fuel cell stacks, and the cooling liquid discharge pipe being arranged to discharge cooling liquid to outside of the fluid distributor and not being directly connected to the plurality of fuel cell stacks, and
    the cooling liquid discharge pipe is located above all of the cooling liquid supply pipe, the fuel gas supply pipe, the anode off-gas exhaust pipe, the oxidant gas supply pipe and the cathode off-gas exhaust pipe in at least the center tunnel.

2. The fuel cell vehicle according to claim 1, wherein
the cooling liquid supply pipe is located above at least one of the fuel gas supply pipe, the anode off-gas exhaust pipe, the oxidant gas supply pipe and the cathode off-gas exhaust pipe in at least the center tunnel.

3. The fuel cell vehicle according to claim 1, wherein
each of the oxidant gas supply pipe and the cathode off-gas exhaust pipe is provided with a valve activated to open in response to an increase of in-pipe pressure.

4. The fuel cell vehicle according to claim 1, wherein
the anode off-gas exhaust pipe has a restriction element and a valve activated in response to an increase of in-pipe pressure to control restricting function of the restriction element.

5. The fuel cell vehicle according to claim 1, further comprising:
    a drive system configured to drive the vehicle;
    a power controller provided to supply electric power, which is generated by and is output from the fuel cell stack, to the drive system; and
    a power supply circuit located at least partly inside the center tunnel and configured to have a power line operative to electrically connect the power controller with the fuel cell stack and a relay operative to block an electrical connection, wherein
    the relay is accessible downward from the center tunnel.

6. The fuel cell vehicle according to claim 1, further comprising:
    an electrical component electrically connected with the fuel cell stack and located on the fuel cell stack.

* * * * *